United States Patent Office 2,787,586
Patented Apr. 2, 1957

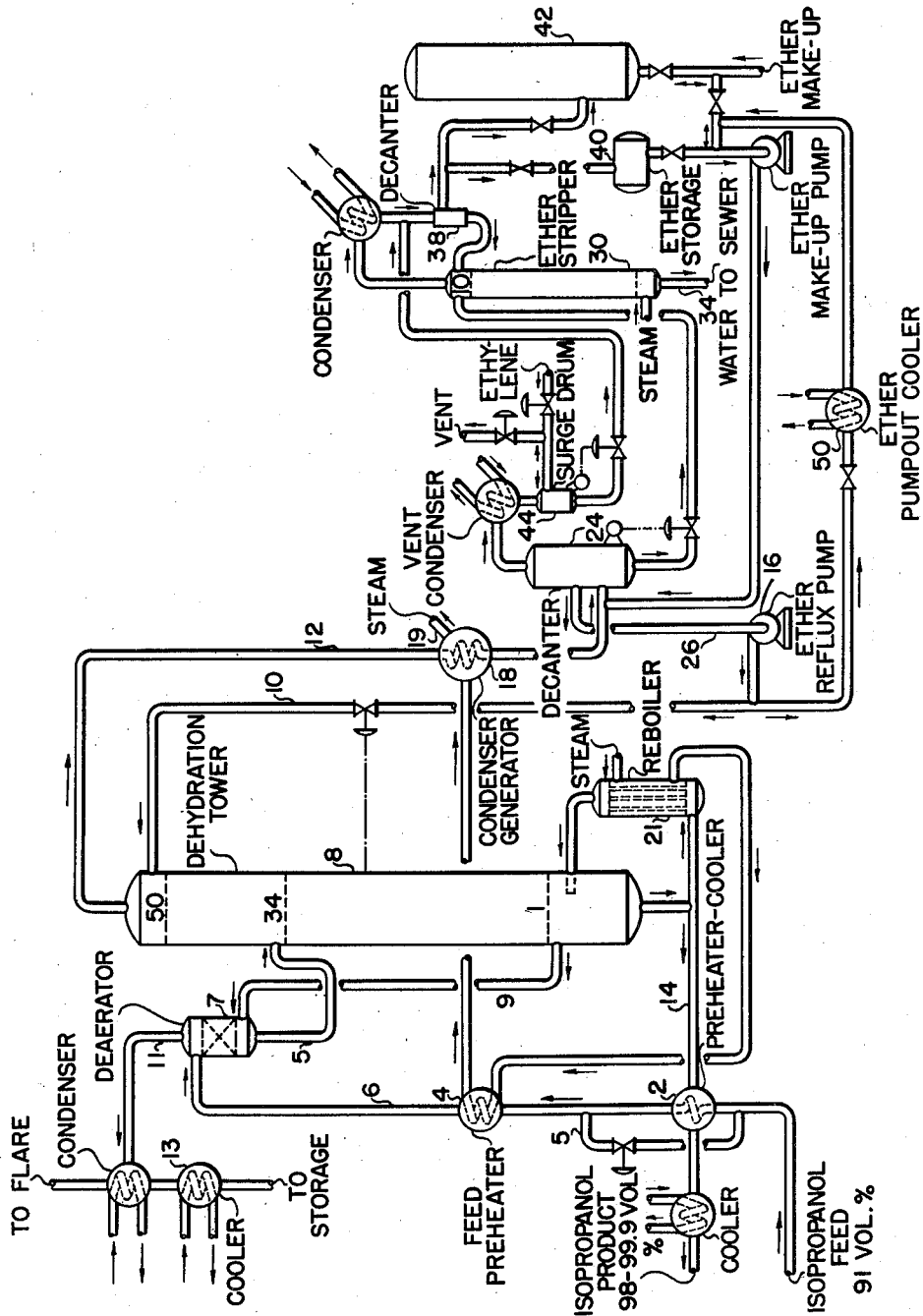

2,787,586

DEHYDRATION OF ISOPROPANOL

William E. Catterall, Summit, N. J., assignor to Esso Research and Engineering Company, a corporation of Delaware Application February 7, 1955, Serial No. 486,519

11 Claims. (Cl. 202—42)

The present invention relates to a process for dehydrating isopropyl alcohol, particularly isopropyl alcohol obtained by hydration of propylene. More particularly, the present invention relates to the process for removing water from isopropyl alcohol by azeotropic distillation with diethyl ether under certain elevated pressures. Still more particularly, the present invention relates to a method for making very high purity alcohol by azeotropic distillation under pressure.

The dehydration of aqueous ethyl alcohol by azeotropic distillation with diethyl ether at superatmospheric pressure of 30–150 p. s. i. g. has hitherto been described in U. S. Patent 2,358,193 of Wentworth. Due to the nature and characteristics of aqueous isopropanol, particularly as prepared by hydration of propylene, the conditions set forth in that patent for dehydration of ethanol are not completely satisfactory for dehydrating isopropanol. As prepared by hydration of propylene, the resulting isopropyl alcohol generally contains specific impurities, such as isopropyl ether, propyl oil and particularly acetone, not generally encountered in crude ethanol.

A particularly acute problem in the preparation of high quality isopropanol is that of odor. Many uses, such as medicinal and perfume preparations, require an alcohol product of extremely high quality and freedom from extraneous odors. Hitherto the dehydration processes even with the use of ethers, were not successful in preparing an extraneous odor-free product.

It is, therefore, the principal purpose of the present invention to set forth a method of dehydrating isopropanol with diethyl ether to recover a substantially water-free and extraneous odor-free product.

It is a still further purpose of the present invention to set forth an integrated process for dehydrating aqueous isopropanol to produce a high-quality product.

It is a still further purpose of the present invention to set forth a "self-purification" technique whereby even contaminated and commercial grade diethyl ether may be employed to produce a high quality and purity dehydrated isopropyl alcohol product.

Other and further objects and purposes of the present invention will become apparent from the more detailed description hereinafter.

The present invention will be described with reference to the accompanying drawing. Crude aqueous isopropanol, such as the constant boiling mixture obtained by atmospheric distillation which contains about 91% isopropanol and may contain small or trace amounts of acetone and other impurities, is passed via exchanger 2 and preheater 4 and line 6 to deaeration tower 7. In its passage in heat exchanged with hot dehydrated isopropanol and hot steam condensate, the crude feed stream is raised in temperature from about 80° F. to about 300–330° F.

The deaeration operation is important in preventing the formation of ether peroxides and of other oxygenated compounds which would affect isopropanol quality. Furthermore, the possibility of explosive air-ether mixtures in the overhead condenser system is avoided. A small portion of the vapor from the dehydration tower reboiler 21 is passed via line 9 to tower 7 for stripping vapor in the deaerator. Air plus some isopropanol and water vapors are taken overhead in the deaerator through line 11, and the isopropanol and water are condensed, cooled and returned to feed storage. The non-condensable portion, primarily air, is sent to a flare stack.

In further accordance with the present invention, the isopropanol is dehydrated by means of diethyl ether as the water entraining agent, the azeotropic distillation being carried out at a pressure of about 150–170 p. s. i. g. in a distillation tower of conventional design, having preferably about 40 plates or more, preferably about 50. The crude alcohol is preferably passed into tower 8 above the midpoint thereof; in a preferred embodiment, at about the 34th plate. Diethyl ether, preheated to about 250–275° F., is admitted to tower 8 through line 10, at about the 50th plate. A pressure of more than 150 p. s. i. g. and preferably 160 to 170 p. s. i. g. is maintained within the tower, and the temperature gradient between the bottom and top of the tower is about 70 degrees, the temperature near the bottom being about 330° F. while that in the upper portion being about 260° F.

The major portion of the water which enters with the isopropanol feed is removed overhead from tower 8 through line 12 as essentially the ethyl ether-water azeotrope, while the dry alcohol, and any acetone present, is removed as a tower bottoms product through line 14; it is cooled to about 120° F. by passage through heat exchanger 2.

It is generally desirable to maintain flexibility of operation in the dehydration tower to produce alcohol products suitable for a variety of purposes. This is particularly true when the isopropanol is prepared by hydration of propylene, a commodity available in large quantities in petroleum refineries. The resulting isopropanol, as has been pointed out, is generally contaminated with small amounts of acetone, and it is desirable to operate the dehydration tower to produce two products, a chemically pure isopropanol consisting of about 99.9% by volume of alcohol, and a 98% product, the balance being oxygenated material, such as acetone, plus water. The 98% product is particularly suited for use as a gasoline additive. Therefore, to adjust the strength of the product withdrawn through line 14, the feed rate is correspondingly adjusted, with the heat input to the dehydration tower 8 remaining constant. Thus there is about a 20% increase in the feed rate when the 98% product is recovered.

To insure adequate separation of water from the isopropanol, it is necessary to keep the diethyl ether content of the liquid on the top 30 or more plates in tower 8 greater than about 70 mol percent. This ether content is maintained by controlling the reflux to the tower through pump 16 and line 10 to hold a given temperature on a plate in the bottom section of the tower.

An important element of the invention is that the high pressure which is required for the dehydration is maintained by pressure of an inert gas, such as ethylene, applied on surge drum 44. Ethylene and any non-condensable gases are vented if the pressure rises and ethylene admitted if the pressure falls on 44. The ethylene is supplied as a mixture of ethane, ethylene, methane, and hydrogen available under pressure directly from a refinery light ends fractionation unit without passage through a compressor. Thus this proceeding ensures the absence of contaminants for the ether, such as heavy ends and sulfur containing materials which would be present due to contamination of the gas with compressor oil.

As the overhead vapors are condensed, the heat of vaporization is advantageously utilized to produce low pressure steam from the reboiler high pressure steam condensate. If the feed is efficiently preheated with the dehydrated product, the unit heat balance is such that the amount of low pressure steam generated is slightly greater than the amount of high pressure steam used. This sitaution is undesirable since an extraneous source of water would have to be added to the high pressure steam condensate for use as feed to the low pressure steam generator. Therefore, to maintain the heat balance such that exactly one pound of low pressure steam is generated for each pound of high pressure steam used, it may be desirable to bypass a small portion of the cold feed around the preheater-cooler 2, thus allowing greater heat removal in the alcohol product cooler. After being condensed in the condenser-generator 18, the tower overhead product enters the decanter 24, where an upper layer of ether is separated from a lower layer of water. The ether layer is pumped back to the top of the tower via lines 26 and 10 as reflux at a controlled rate. The water layer is removed on differential liquid level control and is fed to a low pressure ether stripper, 30, for removal of dissolved ether. Open steam is used for stripping in this tower, and the water, essentially free of ether, is removed as a bottoms product through line 34. Minimum stripping steam is used to allow impurities to purge from the system with the water bottoms. The ether-water overhead product is condensed and enters decanter 38. The water layer from the decanter is refluxed to the ether stripper, while the ether is sent to ether storage drum 40 or 42.

It is an important feature of this invention to maintain alcohol quality independent of the quality of the ether used to dehydrate it. This is done by a "self-purification" technique and by maintaining a large ether inventory relative to ether losses.

From time to time the ether inventor in the decanter, 24, requires replenishment. Make-up ether for this purpose can be added intermittently from either 40 or 42. For the production of high-purity isopropanol it is necessary to use a high-purity ether as the azeotropic agent. However, a purified ether can be prepared in the unit from a relatively impure ether by proper operation. The impure ether is added to the unit for makeup only during periods of 98 vol. percent isopropanol production when product quality is not as critical as during the production of the chemical, i. e. 99.9%, grade. During 98 vol. percent operation the ether in the dehydration tower, in the decanter and in drum 40 will be purified by the extracting action of the isopropanol and water products. While the gasoline grade product is being made, it is also possible to purify the ether in drum 42 by feeding intermittently from the drum to the decanter 38 and returning purified ether to 42 either from the ether stripper overhead decanter or from decanter 24 via the pumpout cooler 50. When production of 99.9 vol. percent isopropanol begins, 24 and 40 are full of ether which has been purified except for minor contamination from the alcohol fed during the 98 vol. percent operation. This minor contamination is purged out in a few hours once the 99.9 vol. percent production begins. Vessel 42 is not normally used during the chemical grade operation.

This "self purification" technique is an important feature of the present invention. It has been determined that even the highest grade ether, an ACS grade distilled over alkaline pyrogallol, caused initial odor degradation of the alcohol product. Thus in accordance with this embodiment of the present invention, even impurity-containing commercial diethyl ether may be employed which by the self-purification technique, produces a dehydrated alcohol product with as high a degree of purity, as measured by odor, as if a C. P. ether were employed. This is demonstrated by the following pilot plant runs:

TABLE I

*Dehydration of 91% isopropanol by the ethyl ether azeotropic distillation process*

[Continuous pilot plant unit; 500 cc./hour feed rate; 160 p. s. i. g.; 161° C. pot temperature]

| Run No. | Isopropanol Feedstock | | Ether Used | Time, Hour | Net Heat Input, B. t. u./ Pound of Feed | Isopropanol Product Quality | | | Change in Odor Class | Remarks |
|---|---|---|---|---|---|---|---|---|---|---|
| | Description | Odor Class | | | | Strength, Wt. Percent [1] | U. V. @ 2,250 A. | Odor Class [2] | | |
| A | 91% Isopropanol Air Saturated. | 3 | Commercial N₂-Ethyl Ether Saturated. | 19 | 1,266 | 98.70 | 3+ | 14 | 11 | Fresh ether added at Hour 9. |
| | | | | 31 | 1,237 | 98.53 | 1.1 | 9 | 6 | |
| | | | | 43 | 1,368 | 99.79 | 0.31 | <9 | <6 | |
| | | | | 51 | 1,362 | 99.67 | | 4 | 1 | |
| B | ----do---- | 3 | Anhydrous grade Ethyl Ether Air-saturated. | 25 | 1,442 | 99.87 | 0.22 | 12 | 9 | Fresh ether added at Hour 43. |
| | | | | 40 | 1,440 | 99.91 | 0.32 | >12 | >9 | |
| | | | | 43 | 1,440 | 99.90 | 0.22 | >12 | >9 | |
| | | | | 16 | 1,495 | 99.92 | 0.20 | | | |
| | | | | 20 | 1,495 | 99.97 | 0.21 | | | |
| C | 91% Isopropanol N₂-saturated. | 3 | ACS grade Ether N₂-saturated. | 40 | 1,495 | 99.99 | 0.20 | >12 | >9 | Fresh ether added at Hour 40. |
| | | | | 48 | 1,495 | 99.99 | 0.11 | 12 | 9 | |
| | | | | 60 | 1,495 | 99.99 | 0.22 | 8 | 5 | |
| | | | | 63 | 1,495 | 99.99 | 0.20 | 5 | 2 | |
| D | ----do---- | 4 | ACS grade Ether, Treated with alkaline pyrogallol and distilled, N₂-saturated. | 4 | 1,138 | | 1.9 | 12 | 8 | Ether inventory increased from 2.5 L. to 9 L. |
| | | | | 16 | 1,138 | 97.15 | 0.39 | ~9 | ~5 | |
| | | | | 20 | 1,138 | 97.16 | 0.28 | ~8 | ~4 | |
| | | | | 44 | 1,586 | 99.98 | 0.27 | ~10 | ~6 | |
| E | Same as Run D | 6 | Same as Run D | 10 | | | 0.30 | 14 | 8 | Used air-saturated feed at Hour 23. |
| | | | | 18 | | | 0.27 | 11 | 5 | |
| | | | | 30 | 1,440 | 99.88 | 0.25 | 7 | 1 | |
| F | 91% Isopropanol N₂-saturated. | 5 | Reused ether from Run E | 7 | | | 0.32 | 9 | 4 | |
| | | | | 10 | | | 0.30 | 9 | 4 | |

[1] Water determined by Karl Fischer method, Wt. percent isopropanol then calculated by difference.
[2] Odor ratings by five-man panel using threshold dilution technique.

These data show clearly that initially, odor degradation occurs of the same order of magnitude with highly purified ether as with commercial ether and that, by the self-purification technique, this odor degration is overcome. That is to say, as the ether is employed in the dehydration and continually recycled, it ceases to degrade appreciably the odor of the freshly dehydrated alcohol.

In Table II there is shown results obtained in a laboratory and a pilot unit operating at somewhat different temperatures and pressures, and with different capacities. The decrease of odor degradation with time is demonstrated in both cases. In the case of pilot unit II, formal odor data were not taken in the early period of the run since the odor degradation was apparent even to the plant operating personnel.

TABLE II

*Continuous dehydration of 91% isopropanol by the ethyl ether process*

| A. Pilot Unit I,[1] Time, Hours | 1 | 24 | 44 | 64 | 72 | | 92 |
|---|---|---|---|---|---|---|---|
| Odor Class of Feed | 4.5 | 4.5 | 4.5 | 4.5 | 4.5 | 4.5 | 4.5 |
| Odor Class of Product | 14 | 9 | 7 | 7 | 6 | | 6 |
| Change in Odor, Classes | 9.5 | 4.5 | 2.5 | 2.5 | 1.5 | | 1.5 |
| B. Pilot Unit II,[2] Time, Hours | | | 42 | 76 | 80–86 | 81 | 87 |
| Odor Class of Feed | | | ~6 | 3.5 | 4.5 | 4 | 3+ |
| Odor Class of Product | | | ~6 | 5 | 4.5 | 5.5 | 5– |
| Change in Odor, Classes | | | 0 | 1.5 | 0 | 1.5 | 2– |

[1] 160 p. s. i. g.; 161° C., pot temperature; 500 cc./hour feed rate; nitrogen blanket; ACS grade ether, re-distilled over alkaline pyrogallol; alcohol was saturated with nitrogen.
[2] 150 p. s. i. g.; 152° C. pot temperature; 50 lbs./hour feed rate. Nitrogen blanket, and ACS grade ether.

By "odor class" reference is had to an arbitrary odor standard wherein the product having the highest purity and showing complete absence of foreign odor-imparting contaminants has an odor class of 1. The odor class rating increases with the increase of foreign odor contamination. To rate an unknown sample by the so-called threshold technique, the sample is diluted with the odor standard until the difference in odor between the standard and the diluted unknown is no longer detectable. The extent of dilution required is the basis for establishing a series of odor class numbers.

These results clearly show the importance of the self-purification technique, and the necessity of starting operation with a high ether inventory, and maintaining the tower ether content constant. If ether losses were to occur, and were these losses to be replaced by the intermittent addition of fresh ether, as is conventional in this type of operation, it is obvious that fresh odor degradation would occur whenever fresh ether, even of the highest purity, is added to the system as make-up. This is avoided in the present process by the arrangement of the decanter, surge drums and ether storage tanks, whereby substantially all the ether to be employed in the operation is initially added, processed through the system, and makeup added as required from the self-purified ether from 40.

What is claimed is:

1. In the azeotropic dehydration of aqueous isopropanol with diethyl ether under pressure to produce a substantially anhydrous product, the improvement of producing a substantially extraneous odor-free product which comprises passing aqueous alcohol and a substantial excess of fresh ether to an azeotropic distillation zone, azeotropically distilling said materials, recovering as a bottoms stream an alcohol product containing less than 99% by volume of isopropanol and contaminated with an extraneous odor, segregating said alcohol product, recovering as overhead an ether-water mixture, separating water from said ether in a separation zone, recycling at least a portion of said ether to said distillation zone, passing another portion of said ether to a storage zone, continuing passage of said ether from said distillation zone and said storage zone to ether-water separation zone till the odor of said alcohol product has substantially improved and is substantially constant, and thereafter recovering an alcohol product of high purity containing more than 99% by volume of isopropanol.

2. The process of claim 1 wherein ether losses in said dehydration process are made up by purified ether withdrawn from said storage zone.

3. The process of claim 1 wherein said ether initially employed is of a commercial grade and contains odor imparting impurities.

4. The process of claim 1 wherein a pressure of at least about 150 p. s. i. g. is maintained in said distillation zone.

5. The process of claim 1 wherein said pressure is maintained by pressure of an inert gas applied on a surge drum.

6. The process of claim 5 wherein said gas is ethylene.

7. An improved process for producing substantially anhydrous isopropanol of a high degree of purity by azeotropic distillation with diethyl ether under pressures in the range from about 150–170 p. s. i. g. which comprises passing aqueous isopropanol and substantially all the diethyl ether required for the operation to an azeotropic distillation zone, taking overhead a stream comprising ether and water, withdrawing initially from said zone as a bottoms steam an impure alcohol product containing about 98% by volume of isopropanol, segregating said alcohol product, separating said ether from said water in a decanting zone, recycling at least a portion of said separated ether to said distillation zone, passing another portion of said ether to a storage zone, stripping ether from said separated water, passing said stripped ether to said storage zone, intermittently passing ether from said storage zone to said decanting zone and returning ether from said decanting zone to storage zone, continuing the passage of said alcohol, ether and water streams until the odor of said recovered alcohol stream is substantially constant and is substantially superior to the odor of the initially recovered product, thereafter decreasing the alcohol feed rate relative to the heat input rate to said distillation zone, and recovering separately an alcohol substantially free of extraneous odors and containing less than 1% by volume of water.

8. The process of claim 7 wherein said last named alcohol product contains about 99.9% by volume of isopropanol.

9. The process of claim 7 wherein said alcohol feed rate relative to the heat input rate is decreased about 20% to form said substantially anhydrous product.

10. In a continuous system for dehydrating aqueous isopropanol wherein diethyl ether is contacted with an aqueous isopropanol feed in a distillation zone and the mixture distilled under superatmospheric conditions to remove overhead a gaseous water-diethyl ether azeotropic mixture, at least partially dehydrated isopropanol being recovered as a bottoms product, and wherein the gaseous diethyl ether-water mixture is condensed in a condensing zone and the water is removed from said mixture in a water separation zone and ether separated from the water is finally recycled to the distillation zone for further contact with fresh aqueous isopropanol feed, the improvement which comprises maintaining a supply of ether in said system in excess of the ether circulating between the distillation zone and the condensing zone whereby the ether which initially contains odor imparting impurites is purified by the isopropanol which absorbs said impurities and whereby after the ether within the system is thus purified the dehydrated isopropanol product is recovered substantially free of odoriferous impurities.

11. The process of claim 10 wherein a portion of said ether initially supplied to said distillation zone is passed to a storage zone and ether losses in said dehydration process are made up by purified ether withdrawn from said storage zone.

References Cited in the file of this patent

UNITED STATES PATENTS

| 2,358,193 | Wentworth | Sept. 12, 1944 |
| 2,489,619 | Corlson et al. | Nov. 29, 1949 |